United States Patent
Duran et al.

(10) Patent No.: US 12,461,831 B2
(45) Date of Patent: Nov. 4, 2025

(54) METHOD FOR OPERATING A CONTROL UNIT

(71) Applicant: Robert Bosch GmbH, Stuttgart (DE)

(72) Inventors: Ibrahim Duran, Boeblingen (DE); Adrian Haug, Leonberg (DE); Daniel Wettach, Pforzheim (DE); Dieter Bruss, Aidlingen (DE); Manuela Niekisch, Gechingen (DE); Martin Karle, Leinfelden-Echterdingen (DE); Philipp Brechel, Stuttgart (DE); Silke Bruening, Schwieberdingen (DE); Stefan Kummler, Pleidelsheim (DE); Thomas Tietjen, Muensigen/Trailfingen (DE); Wei Ling, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 71 days.

(21) Appl. No.: 18/332,317

(22) Filed: Jun. 9, 2023

(65) Prior Publication Data
US 2023/0409449 A1    Dec. 21, 2023

(30) Foreign Application Priority Data
Jun. 15, 2022    (DE) .................. 10 2022 206 080.6

(51) Int. Cl.
*G06F 11/20*    (2006.01)

(52) U.S. Cl.
CPC .............................. *G06F 11/2033* (2013.01)

(58) Field of Classification Search
CPC ........................... G06F 11/20; G06F 11/2033
See application file for complete search history.

(56) References Cited

U.S. PATENT DOCUMENTS

| | | | | |
|---|---|---|---|---|
| 5,161,112 A * | 11/1992 | Guerra | ................ | G01R 31/007 702/58 |
| 6,041,884 A * | 3/2000 | Shimizu | ............... | B62D 5/0481 180/443 |
| 6,455,949 B1 * | 9/2002 | Blauensteiner | ........... | H02J 1/08 307/10.6 |
| 7,916,564 B2 * | 3/2011 | Park | ...................... | G11C 29/88 365/189.07 |
| 2007/0046419 A1 * | 3/2007 | Inagaki | .................... | G01K 7/24 374/E7.031 |
| 2007/0124027 A1 * | 5/2007 | Betzitza | ................ | B60W 50/16 701/1 |

(Continued)

FOREIGN PATENT DOCUMENTS

DE    102017117297 A1    1/2019

*Primary Examiner* — Kamini B Patel
(74) *Attorney, Agent, or Firm* — NORTON ROSE FULBRIGHT US LLP

(57) ABSTRACT

A method for operating a computing arrangement. The computing arrangement includes: a plurality of single-chip systems, wherein the single-chip systems are configured to obtain the same sensor data, and at least one degradation mechanism configured to perform functions of a failed single-chip system on another single-chip system. In the method, when a failure of at least one of the single-chip systems is sensed, a switch takes place to another single-chip system to perform a function assigned to the failed single-chip system. A degradation mechanism is additionally performed.

14 Claims, 2 Drawing Sheets

(56) References Cited

U.S. PATENT DOCUMENTS

| | | | | |
|---|---|---|---|---|
| 2008/0279283 | A1* | 11/2008 | Weinstock | H04N 19/86 375/240.27 |
| 2010/0063651 | A1* | 3/2010 | Anderson | G05D 1/0088 701/1 |
| 2011/0234304 | A1* | 9/2011 | Kanekawa | G06F 11/1641 327/526 |
| 2012/0330490 | A1* | 12/2012 | Ozaki | H02P 29/0241 701/22 |
| 2018/0115795 | A1* | 4/2018 | Chinnaiyan | H04N 21/234381 |
| 2019/0089764 | A1* | 3/2019 | Jayachandran | H04L 65/762 |
| 2020/0002026 | A1* | 1/2020 | Duong | B64G 1/506 |
| 2020/0132011 | A1* | 4/2020 | Kitagawa | G06N 3/084 |
| 2020/0164893 | A1* | 5/2020 | Orlov | B60W 50/04 |
| 2021/0206312 | A1* | 7/2021 | Mochizuki | G08G 1/166 |
| 2022/0188394 | A1* | 6/2022 | Kimura | G06V 20/593 |
| 2023/0202435 | A1* | 6/2023 | Schmidt | B60T 7/12 701/70 |
| 2023/0294650 | A1* | 9/2023 | Brenn | B60T 8/885 303/3 |
| 2024/0059323 | A1* | 2/2024 | Gerrese | H04W 4/023 |
| 2024/0356669 | A1* | 10/2024 | Chermon | H04K 3/65 |

\* cited by examiner

METHOD FOR OPERATING A CONTROL UNIT

CROSS REFERENCE

The present application claims the benefit under 35 U.S.C. § 119 of German Patent Application No. DE 10 2022 206 080.6 filed on Jun. 15, 2022, which is expressly incorporated herein by reference in its entirety.

FIELD

The present invention relates to a method for operating a control unit and to such a control unit, in particular a control unit configured for use in a motor vehicle.

BACKGROUND INFORMATION

It is conventional to use a main computer, e.g., a single-chip system (SoC: system-on-chip) or a microcontroller, in conjunction with a monitoring computer in automotive control units (ECU: electronic control unit). The task of the main computer is to calculate the algorithms or functions of the control unit. The task of the monitoring computer is to monitor the correct operation of the main computer, e.g., with regard to power supply, temperature, watchdog, etc., and to cause a shutdown or a reset in the event of a fault. A SoC is understood as a component or chip, i.e., an integrated circuit, on a semiconductor substrate, in which all or a large portion of the functions of an electronic system are integrated.

Control units used predominantly in the area of central control units use a plurality of main computers (Multi-SoC). In this case, each main computer calculates the data of the sensors connected to the respective computer. As is conventional, these main computers are monitored by a monitoring computer and, in the event of a fault, are shut down or reset. However, it should be noted that in the event that one of the main computers fails, the data of the connected sensors can no longer be analyzed.

In addition, it must be considered that, for example, in video control units of today, safety-relevant functions, such as the emergency braking functionality (AEB: autonomous emergency braking), up to level 2 are already realized. Furthermore, control units for autonomous driving or for level 3, level 4 and level 5 are currently being developed.

However, failures of individual components, the main computers or SoCs, and consequently of the connected sensors have a significant impact on the function of the system. In such cases, the responsible driver of the vehicle must be resorted to. However, the driver fallback solution is no longer possible or only possible to a limited extent in the systems with level 3 to level 5.

In order to develop a more fault-tolerant system, reliance is therefore already being placed on fully redundant architectures. However, redundant architectures also mean doubling the components and space requirement on the printed circuit board. Moreover, in the event of a fault, a complete switch from one chip to another equivalent chip in the sense of the decomposition according to ISO26262 must take place.

This concept can only be implemented with difficulty within the framework of ADAS (advanced driver assistance systems) control units suitable for mass use, since ADAS control units are cost-driven and are developed specifically to the application.

Reasons for this are, for example: costs, space requirement in the vehicle, in particular printed circuit board/housing, thermal, i.e., power dissipation, etc. Due to the application-specific development, the main computers used are heavily utilized, which is why hardly any further or even no further functions can be realized on the main computers.

German Patent Application No. DE 10 2017 117 297 A1 describes a control system for a motor vehicle comprising a first control unit for controlling a first function of the motor vehicle and a second control unit for controlling a second function of the motor vehicle, wherein, in the event that one of the two control units is faulty, its function can be controlled by the other control unit.

SUMMARY

According to the present invention, a method for operating a control unit, and a control unit are provided. Example embodiments arise from the disclosure herein.

The method according to the present invention is for operating a control unit, wherein the control unit comprises a plurality of single-chip systems configured to obtain the same sensor data, and at least one degradation mechanism configured to perform functions of a failed single-chip system on another single-chip system. According to an example embodiment of the present invention, in the method, when a failure of at least one of the single-chip systems is sensed, a switch takes place to another single-chip system to perform a function assigned to the failed single-chip system, wherein the degradation mechanism is additionally performed.

Switching means in this context that the function is in part covered or additionally also covered by the other single-chip system.

The control unit according to an example embodiment of the present invention is configured to perform the method presented herein and thus represents a fault-tolerant system comprising a plurality of single-chip systems (SoC) which can perform a degradation mechanism.

In its configuration, the control unit uses multi-SoC architectures to realize a fault-tolerant system using degradation mechanisms. To this end, the control unit comprises multiple SoCs that obtain the same sensor data, and degradation mechanisms to be able to calculate the functions of the failed SoC in another SoC. Furthermore, mechanisms for the short-term, in particular thermal, overloading of a SoC can be provided in order to be able to carry out an emergency response.

The degradation mechanism is based on the presence of a plurality of SoCs, which, in the event of a fault, in part or additionally calculate the data or functions of the respective other SoCs.

The degradation mechanism may be implemented in a central control unit. However, it depends on the configuration of the systems, the number of cameras, the necessary color depth for the algorithms, etc. on the one hand and on the necessary minimum functions for a safe state on the other hand.

Moreover, less important sensors may be discarded in order to be able to analyze the main sensor data. Furthermore, less relevant functions can be turned off in the SoC in order to maintain the most important functions.

In further embodiments of the present invention, the following may be provided:

According to an example embodiment of the present invention, a plurality of SoCs may be used, which can each process only a portion of the sensor data. This enables an inexpensive and compact design.

The degradation mechanisms can perform a reduction of the refresh rate, e.g., to 50%, in order to be able to process all sensors. Moreover, a reduction of the resolution, e.g., to 50%, can be performed in order to be able to process all sensors.

In addition, the field of view can be reduced; for example, cameras can only still analyze a subset of the entire image. Furthermore, the color depth can be reduced, e.g., to 50%, in order to be able to process all sensors.

These or similar degradations are also possible in the case of non-video-based sensors, such as radar or ultrasound or lidar.

The mechanisms for the short-term thermal overloading can be provided in order to be able to process an emergency response, e.g., to drive to the roadside and stop.

Less important sensor data may be discarded, wherein camera streams of near-field cameras are in particular dropped and camera streams of far-field cameras continue to be used.

Functions in the SoC can be turned off in different use cases:
On the highway, functions for overtaking maneuvers may, for example, be turned off.
In the city, far-field cameras are dropped and only near-field cameras are still being used.
Redundant calculations of video functions used to check for plausibility and to respond in a fault-safe or failure-safe manner may be turned off.
If diagnostic data from one SoC cannot be obtained, backup data or a replacement diagnosis from another SoC can still be available.

The degradation enables the development of a more compact control unit with reduced thermal power.

The possibility of being able to calculate short-term fault responses in a SoC but not having to carry it out completely redundantly in a further SoC in the control unit provides a significant cost advantage compared to fully redundant designs.

In particular, in this way, the disadvantage of known control units of either not obtaining a fault-tolerant system or establishing complete hardware redundancy can be avoided.

Further advantages and configurations of the present invention arise from the description and the figures.

It goes without saying that the aforementioned features and the features yet to be explained below can be used not only in the respectively specified combination, but also in other combinations or on their own, without leaving the scope of the present invention.

DETAILED DESCRIPTION OF EXAMPLE EMBODIMENTS

The present invention is illustrated schematically in the figures on the basis of embodiments and is described in detail below with reference to the figures.

Figure 1:
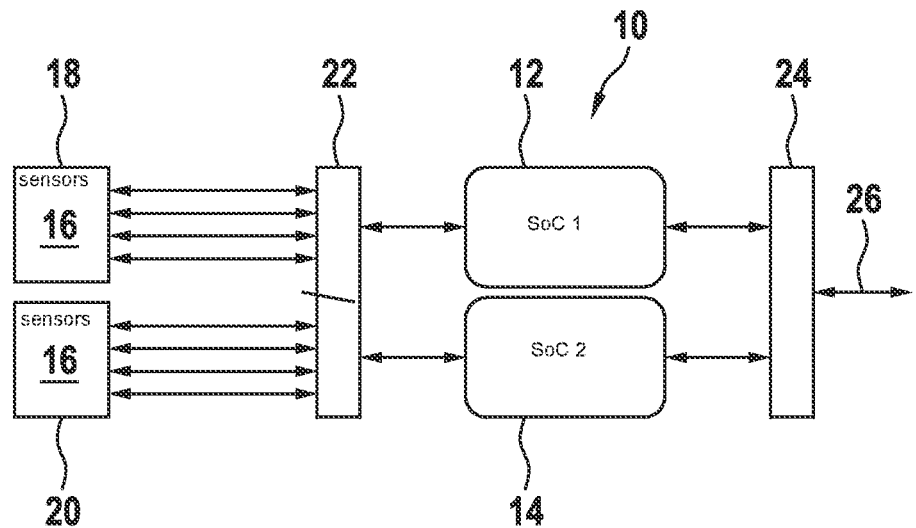
FIG. 1 shows an example embodiment of the presented control unit in a block diagram, according to the present invention.

In FIG. 1, a control unit is shown in a schematic representation and is denoted overall by reference sign 10. The control unit 10 comprises a first single-chip system SoC 1 12 and a second single-chip system SoC 2 14. Furthermore, eight sensors 16, grouped in two blocks 18 and 20, are shown by way of example and are connected via first connections 22 to all SoCs 12, 14. The sensor data is available to the single-chip systems SoC 1 12 and SoC 2 14.

In the normal operating state, SoC 1 12 processes the respectively assigned sensors 16 from the first block 18 and SoC 2 14 processes the respectively assigned sensors 16 from the second block 20. Via second connections 24, sensed data are provided to an output 26.

Figure 2:
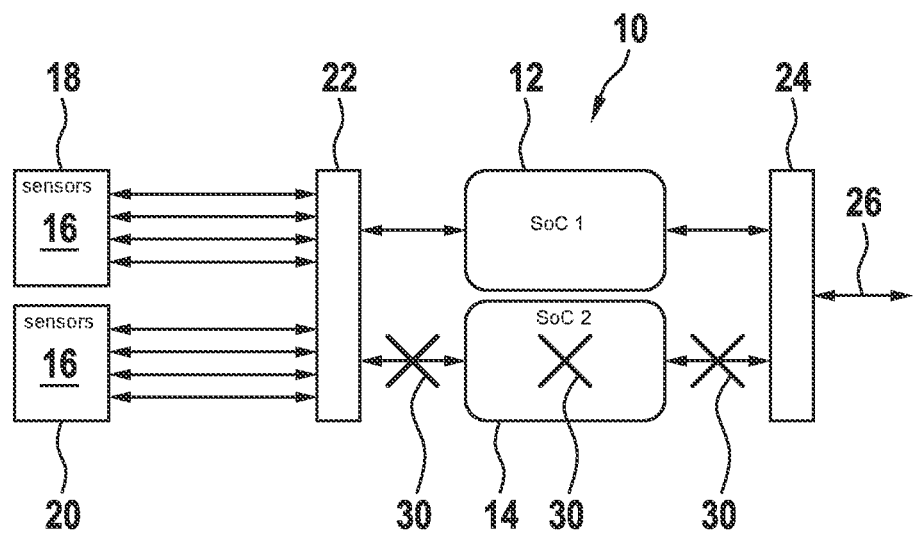
FIG. 2 shows the control unit of FIG. 1 in the event of a fault, according to an example embodiment of the present invention.

If a fault 30 occurs on one of the SoCs 12 or 14, on SoC 2 14 in FIG. 2, the respectively other SoC 12 or 14, SoC 1 12 in this case, takes over the sensors 16 assigned to the faulty SoC 12 or 14, SoC 2 14 in this case, the sensors 16 in the second block 20 in this case, and processes the data by applying the above-described mechanisms.

The mutually connected output 26 ensures that the data are retained or can be realized by the respectively operable SoC 12 or 14.

Figure 3:
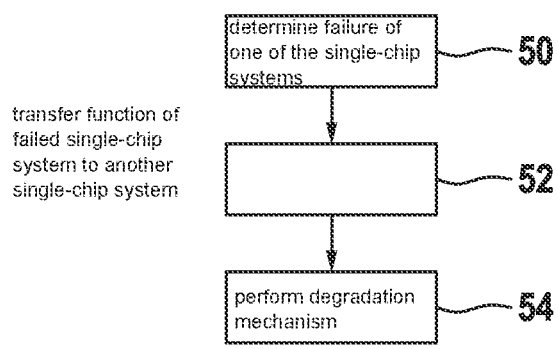
FIG. 3 shows a possible flow of a method for performing a degradation mechanism in a flow chart, according to an example embodiment of the present invention.

In FIG. 3, a flow chart describes a possible flow for performing a method of the type presented herein for operating a control unit. This control unit comprises a plurality of single-chip systems and at least one degradation mechanism. The latter is typically implemented in hardware and/or software.

In a first step 50, a failure of one of the single-chip systems is determined. The function of the failed single-chip system is then transferred to another single-chip system in step 52. Furthermore, in a step 54, the degradation mechanism is performed in order to assist or ensure the further operation of the control unit.

It is important that the control unit is configured to sense a failure of one of the single-chip systems and to then select a suitable other single-chip system that can perform the function(s) assigned to the failed single-chip system.

What is claimed is:

1. A method for operating a control unit, the control unit including: a plurality of single-chip systems each embodied as a respective system-on-chip (SoC) set up to obtain sensor data that is identical for all of the SoCs, wherein each of the SoCs is assigned a different respective one of a plurality of predefined functions that the respective SoC, and not others of the SoCs, is to perform at a first performance level with respect to at least one predefined performance criterion and using a respective portion of the identical sensor data, when the respective SoC is in a faultless state, the method comprising:

sensing that one of the SoCs, to which a first of the plurality of predefined functions had been assigned for performance at the first level, is in a failure state;

responsive to the sensing of the one of the SoCs being in the failure state, performing a reassignment that includes:

determining which one or more of others of the plurality of SoCs are to replace the SoC that has been sensed as being in the failure state for performance of the first predefined function that had been assigned to the SoC that is in the failure state;

executing a degradation mechanism to identify a second performance level at which to perform the first predefined function, the second performance level being degraded with respect to the at least one predefined performance criterion compared to the first performance level; and assigning to the determined one or more of the others of the plurality of SoCs a degraded performance of the first predefined function at the second performance level and using the sensor data; and based on the reassignment, implementing, by the determined one or more of the others of the plurality of SoCs, the degraded performance of the first predefined function at the second performance level.

2. The method according to claim 1, wherein the at least one predefined performance criterion includes a refresh rate criterion so that performance of the first predefined function at the second performance level is at a reduced refresh rate than performance of the first predefined function at the first performance level.

3. The method according to claim 1, wherein the at least one predefined performance criterion includes a data throughput criterion so that performance of the first predefined function at the second performance level is at a reduced data throughput than performance of the first predefined function at the first performance level.

4. The method according to claim 1, wherein the at least one predefined performance criterion includes a resolution criterion so that performance of the first predefined function at the second performance level is at a reduced resolution than performance of the first predefined function at the first performance level.

5. The method according to claim 1, wherein the at least one predefined performance criterion includes a field of view criterion so that performance of the first predefined function at the second performance level is at a reduced a field of view than performance of the first predefined function at the first performance level.

6. The method according to claim 1, wherein the at least one predefined performance criterion includes a color depth criterion so that performance of the first predefined function at the second performance level is at a reduced a color depth than performance of the first predefined function at the first performance level.

7. The method according to claim 1, wherein, for the implementation of the degraded performance of the first predefined function, a short-term thermal overloading of at least one of the one or more of the others of the plurality of SoCs is caused in order to be able to carry out an emergency response.

8. The method according to claim 1, wherein the at least one predefined performance criterion includes a camera-type criterion so that, for the performance of the first predefined function at the second performance level, camera streams of near-field cameras are dropped and camera streams of far-field cameras continue to be used.

9. The method according to claim 1, wherein the at least one predefined performance criterion includes a camera-type criterion so that, for the performance of the first predefined function at the second performance level, camera streams of far-field cameras are dropped and camera streams of near-field cameras continue to be used.

10. The method according to claim 1, wherein the at least one predefined performance criterion includes a maneuver-type criterion so that, for the performance of the first predefined function at the second performance level, functions for overtaking maneuvers are turned off.

11. The method according to claim 1, wherein the at least one predefined performance criterion includes a calculation redundancy criterion so that, for the performance of the first predefined function at the second performance level, a redundant calculation of video functions is turned off.

12. The method according to claim 1, wherein the at least one predefined performance criterion includes a sensor-type criterion so that the performance of the first predefined function at the second performance level includes degrading a performance of a function using sensor data of non-video-based sensors.

13. The method according to claim 12, wherein the non-video-based sensors include a radar or an ultrasound or a lidar.

14. A control unit, comprising:
a plurality of single-chip systems each embodied as a respective system-on-chip (SoC) set up to receive sensor data that is identical for all of the SoCs, wherein each of the SoCs is assigned a different respective one of a plurality of predefined functions that the respective SoC, and not others of the SoCs, is to perform at a first performance level with respect to at least one predefined performance criterion and using a respective portion of the identical sensor data, when the respective SoC is in a faultless state, and the control unit is configured to:
sense that one of the SoCs, to which a first of the plurality of predefined functions had been assigned for performance at the first level, is in a failure state;
responsive to the sensing of the one of the SoCs being in the failure state, performing a reassignment that includes:
determine which one or more of others of the plurality of SoCs are to replace the SoC that has been sensed as being in the failure state for performance of the first predefined function that had been assigned to the SoC that is in the failure state;
execute a degradation mechanism to identify a second performance level at which to perform the first predefined function, the second performance level being degraded with respect to the at least one predefined performance criterion compared to the first performance level; and
assign to the determined one or more of the others of the plurality of SoCs a degraded performance of the first predefined function at the second performance level and using the sensor data; and
based on the reassignment, implement, on the determined one or more of the others of the plurality of SoCs, the degraded performance of the first predefined function at the second performance level.

* * * * *